United States Patent [19]

Kristoff

[11] Patent Number: 4,852,866
[45] Date of Patent: Aug. 1, 1989

[54] VISE ADAPTER FOR THREADED OBJECTS

[76] Inventor: Louis D. Kristoff, 415-C Banana Cay Dr., South Daytona, Fla. 32019

[21] Appl. No.: 148,033

[22] Filed: Jan. 25, 1988

[51] Int. Cl.$^4$ .............................................. B25B 1/00
[52] U.S. Cl. .................................... 269/87.2; 269/277
[58] Field of Search ............... 269/277, 278, 273, 87.2

[56] References Cited

U.S. PATENT DOCUMENTS

| 791,379 | 5/1905 | Shepardson | 269/278 |
|---|---|---|---|
| 1,336,610 | 4/1920 | Borchers | 269/277 |
| 1,672,808 | 6/1928 | Hansel | 269/277 |
| 2,003,619 | 6/1935 | Williamson | 269/87.2 |
| 2,438,989 | 4/1948 | Billman | 269/277 |
| 2,892,480 | 6/1959 | Franck | 269/278 |

FOREIGN PATENT DOCUMENTS 154281 3/1982 Fed. Rep. of Germany ...... 269/277

Primary Examiner—Robert C. Watson
Attorney, Agent, or Firm—MacDonald J. Wiggins

[57] ABSTRACT

A vise adapter for clamping in a bench vise or the like is provided for holding threaded objects. The adapter has a pair of parallel rectangular blocks arranged to slide from a closed position to an open position. The opposing faces of the blocks each have mating threaded essentially semi-cylindrical channels thereacross forming threaded openings when the faces are contiguous. A threaded object is placed in a channel of matching diameter and thread pitch, the blocks closed, and clamped for performing operations on the object.

10 Claims, 2 Drawing Sheets

VISE ADAPTER FOR THREADED OBJECTS

BACKGROUND OF THE INVENTION

1. Field of the Invention

The present invention relates to vises and more particularly to an adapter for gripping and holding threaded objects in a vise to permit sawing and similar operations thereon.

2. Description of the Prior Art

In machine shops, workshops, and the like, there is often a requirement for holding a threaded rod, screw, bolt, or the like for performing a machine operation thereon. For example, often a screw or bolt is available but is too long for the desired application and requires shortening by sawing. It is often difficult to hold a round threaded device in a conventional vise to permit accurate sawing. No known tool is readily available to the mechanic or machinist for this purpose. Thus, there is a need for a simple, low cost tool which will grip and hold threaded rods, screws, bolts, and the like for clamping in a vise to permit a machine operation thereon.

SUMMARY OF THE INVENTION

One implementation of the vise adapter of the invention includes a pair of rectangular metal jaws having opposing faces with the jaws slidably joined at each end thereof by a rod such that the jaws may be closed, or opened in a horizontal plane to a restricted gap of about ¼ inch. When the jaws are closed, a plurality of cylindrical threaded openings therein is defined along the line of interface of the jaws and transverse to the horizontal plane. Each opening has the diameter and thread pitch of a different standard machine thread. Each opening is formed from essentially a 180° arc in each of the opposing faces.

When the jaws are opened, a threaded rod or the like may be placed in the half-opening of one jaw and the opposing jaw closed to contact the threaded rod. The opposing jaw faces are relieved so as to leave a very small gap when the jaws are closed onto a threaded rod. The vise adapter is then placed in a bench vise which is tightened to force the two jaws together, securely gripping the threaded rod. In the event the rod is to be sawed, the amount projecting is adjusted to the length to be removed.

It is preferable that the jaws of the vise adapter be formed from tool steel or case hardened steel such that a sawing operation would not normally damage the surface of the jaws.

It is therefore a principal object of the invention to provide a simple vise adapter which can grip a bolt, screw, threaded rod, or the like and which can be placed in a bench vise to hold the threaded rod securely for performing a machine operation thereon.

It is another object of the invention to provide a vise adapter for holding threaded objects in a vise such that sawing or other machine work may be performed thereon without the object slipping and without damage to the threads thereof.

These and other objects and advantages of the invention will become apparent from the following detailed description when read in conjunction with the drawings.

DETAILED DESCRIPTION OF THE PREFERRED EMBODIMENT

Figure 1:
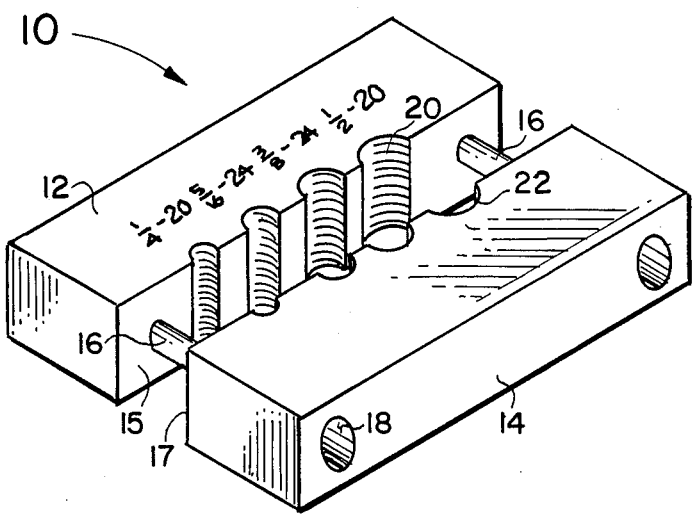
FIG. 1 shows a perspective view of one embodiment of the invention in which the jaws are shown in an open position.

Referring to FIG. 1, a perspective view of one embodiment of the vise adapter 10 of the invention is shown. A first rectangular block 12, preferably of tool steel, is shown having a plurality of essentially semi-cylindrical channels 20 of various diameter cut into one face 15 thereof. A second rectangular mating block 14 is shown having an opposing face 17 to face 15 of block 12 A matching set of essentially semi-cylindrical channels 22 is cut in opposing face 17. Blocks 12 and 14 are mounted on slides 16 such that faces 15 and 17 can be pushed together. When jaws 12 and 14 are pushed together, it will be understood that each pair of opposing channels 20 and 22 form a threaded opening. The diameter and threads of openings 20–22 are selected in accordance with the standard thread pitches desired and may be marked as shown. For example, in FIG. 1, the sizes are illustrated as ¼-20, 5/16-24, ⅜-24, and ½-20.

Figure 5:
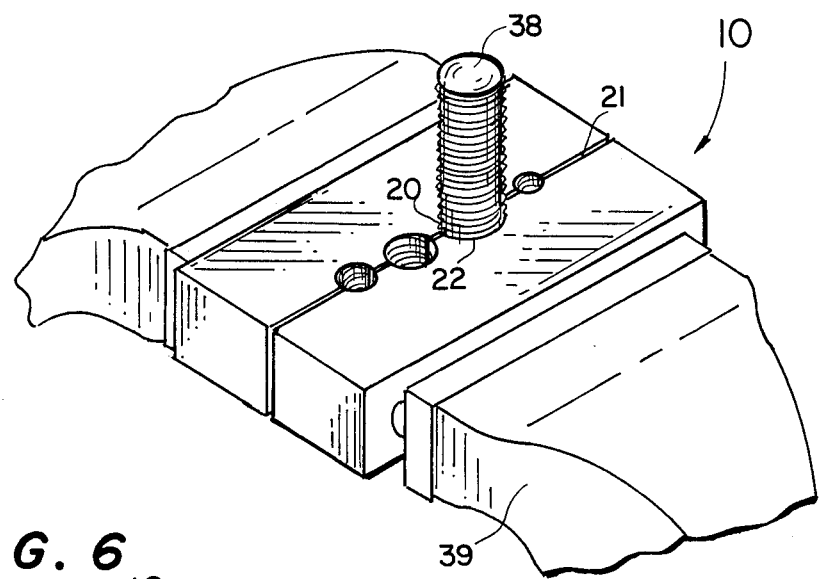
FIG. 5 shows a perspective view of the embodiment of FIG. 1 holding a threaded rod in a vise.

Advantageously, each of the channels 20 and 22 have an arc which is slightly less than 180°. Therefore, when a threaded rod 38 of the proper diameter and thread pitch is placed in channel 20 and threaded jaw 14 closed, jaw faces 15 and 17 will not close completely. At this point, the vise adapter may be placed between the jaws of a bench vise 39 either vertically or horizontally as illustrated in FIG. 5 and tightened to securely clamp rod 38. As described, a small gap 21 will remain between the closed adapter jaws to permit secure clamping of rod 38. Any desired operation, such as shortening, slotting, notching or the like can be performed safely and quickly.

Figure 2:
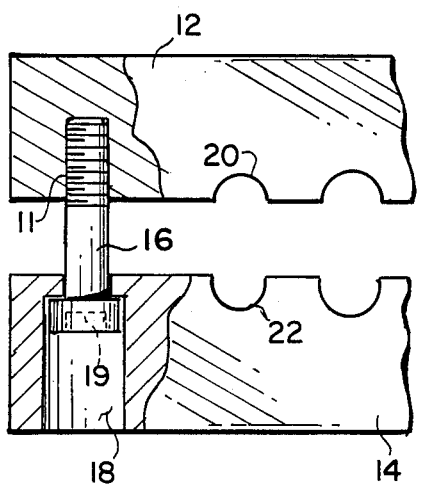
FIG. 2 shows a partial view of the vise adapter of Figure 1 showing in cutaway view the method of joining the jaws thereof.

Turning to FIG. 2, the method of slidably joining jaws 12 and 14 is illustrated in the cutaway portion thereof. A bore 18 is provided to pass a cylindrical head 19 of bolt 16. Bolt 16 may be a socket head type. Bolt 16 is threaded into threaded opening 11 of jaw 12. The depth of bore 18 is selected such that head 19 does not extend beyond the outer face of block 14 when the jaws 14 and 12 are closed. Therefore, the vise adapter 10 may be placed in bench vises having any width of jaws without interference.

Figure 3:
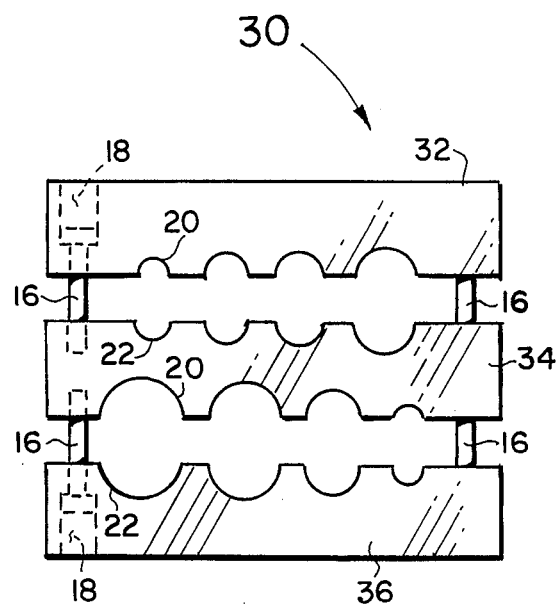
FIG. 3 shows an alternative embodiment of the invention having two sets of jaws.

An alternative embodiment of the invention is shown in FIG. 3 having two sets of jaws with a common jaw 34. Jaw 34 mates with jaw 32 and jaw 36. In this implementation, jaws 32 and 36 are formed identically with jaw 14 of the embodiment of FIG. 1. This alternative embodiment permits a larger number of threaded openings 20–22 to be provided without an increase in length. Thus, the tool is compact and easy to handle.

Figure 4:
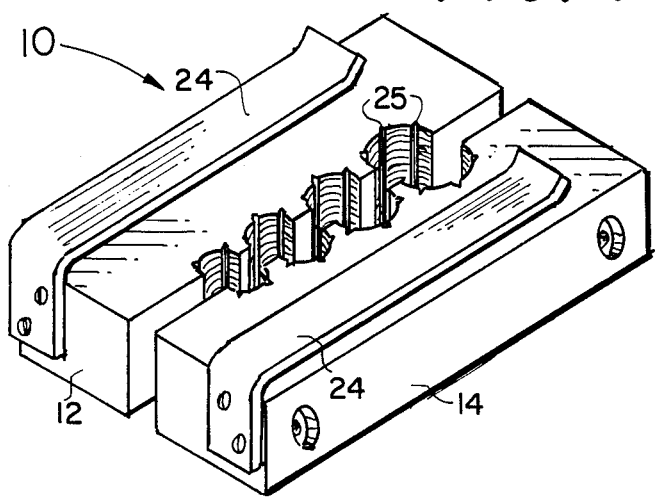
FIG. 4 shows a perspective view of the embodiment illustrated in FIG. 1 having saw blade guides attached thereto.

FIG. 4 illustrates the addition of a pair of said guides 24 attached to jaws 12 and 14 of the embodiment of FIG. 1. Saw guides 24 may be formed from spring steel or other similar material, and assist in a sawing operation with a hacksaw or the like to ensure a square cut of the threaded object. The embodiment of FIG. 4 also includes a plurality of chase grooves 25 in threaded channels 20 and 22. This permits the cutoff threaded object to be un-screwed from the vise adapter 10 after a sewing operation by loosening the bench vise slightly an backing the cut threaded object out through the chased threads. Therefore, any burrs or the like from the sawing operation will be removed.

Figure 6:
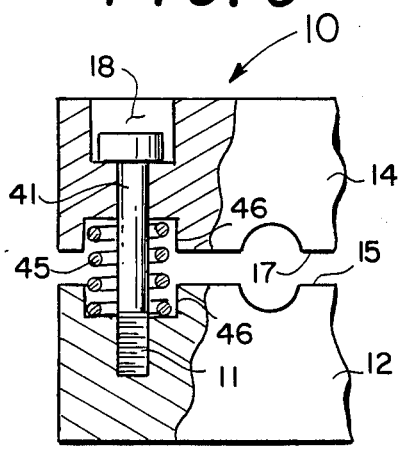
FIG. 6 shows a partial and cross-sectional view of an alternative embodiment of the vise adapter shown in FIG. 1 having a spring for maintaining the jaws normally separated.

FIG. 6 illustrates, in a partial cutaway view of the embodiment of FIG. 1, an improvement thereto. A pair of counterbores 46 is made in the faces 15 and 17 of jaws 14 and 12 to accept a compression spring 45. A bore 41 is provided for the shank of bolt 16. This construction will maintain the jaws 14 and 12 in the open position when the tool is not in use but which will compress when tightened between bench vise jaws or the like.

As previously discussed, it is preferred to construct the vise adapter from tool steel. However, other materials, such as aluminum and plastic may be suitable for certain use of the adapter.

Although the vise adapter of the invention has been disclosed with reference to specific embodiments, it is to be understood that various modifications may be made thereto without departing from the spirit and scope of the invention.

I claim:

1. In a vise adapter for holding a threaded object, the improvement comprising:
   a first essentially rectangular block having a first clamping face, said first face having at least one essentially semi-cylindrical channel thereacross, said channel having an arc slightly less than 180°;
   a second essentially rectangular block having a second clamping face opposing said first clamping face, said second face having at least one essentially semi-cylindrical channel thereacross for mating with said channel of said first face; and
   slide means for slidably coupling said first and second blocks to permit said first and second opposing faces to be moved and clamped in contact with each other, said channels thereby forming an essentially cylindrical opening, said channels each including threads forming a continuous thread through said opening for accepting threads of said object, said threaded channels including chase grooves thereacross, wherein said threaded object is gripped in said essentially cylindrical opening.

2. The adapter as recited in claim 1 in which said first and second faces include a plurality of threaded mating channels of different diameters and thread pitches.

3. The adapter as recited in claim 1 in which said slide means includes biasing means for holding said faces apart prior to use of said adapter.

4. The adapter as recited in claim 1 which further includes saw guide means attached to each of said rectangular blocks for guiding a saw blade during a cutting of said threaded object.

5. The adapter as recited in claim 1 in which said threaded channels include chase grooves therein.

6. The adapter as recited in claim 1 in which said first and second blocks are formed from tool steel.

7. An adapter for clamping in a bench vice or the like to hold threaded objects such as rods, bolts and the like during sawing and similar operations comprising:
   (a) a pair of essentially rectangular blocks disposed to have parallel opposing faces, each of said blocks having a saw guide formed from spring steel attached thereto;
   (b) a pair of rods joining said pair of blocks for permitting a first of said blocks to slide from a first position in which said faces are spaced apart to a second position in which said faces are contiguous; and
   (c) each of said opposing faces of said blocks having a plurality of threaded essentially semi-cylindrical channels therein forming threaded essentially cylindrical openings when said faces are contiguous, each of said threaded channels including chase grooves thereacross, each of said openings having threads and diameters to accept selected object thread pitches and diameters.

8. The adapter as recited in claim 7 which further comprises springs mounted between said opposing faces biasing said blocks apart when said adapter is not in use.

9. The adapter as recited in claim 7 in which said threaded openings include chase grooves therein.

10. A vise adapter to be clamped in a bench vise or the like to hold threaded rods, bolts and the like of selected thread pitches and diameters comprising:
   first, second and third essentially rectangular bars arranged to have opposing faces between said first and second bars, and between said second and third bars;
   a first pair of rods joining said first and second bars, said first bar slidable from a closed position in which said opposing faces are contiguous to an open position;
   a second pair of rods joining said second and third bars, said third bar slidable from a closed position in which said opposing faces are contiguous to an open position;
   each of said opposing faces of said first and second blocks having a plurality of threaded essentially semi-cylindrical channels therein forming threaded essentially cylindrical openings when said faces are contiguous;
   each of said threaded semi-cylindrical channels in said first, second, and third blocks having a plurality of grooves thereacross for chasing threads of said rods, bolts and the like held in said adapter.

* * * * *